US006643037B1

(12) United States Patent
Jeran et al.

(10) Patent No.: US 6,643,037 B1
(45) Date of Patent: Nov. 4, 2003

(54) APPARATUS AND METHOD FOR DETECTING THE PRESENCE OF A PAGE IN AN IMAGE SCANNER

(75) Inventors: Paul L Jeran, Meridian, ID (US); Eric L. Andersen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/399,595

(22) Filed: Sep. 20, 1999

(51) Int. Cl.[7] ................................................. H04N 1/04
(52) U.S. Cl. ...................... 358/488; 358/497; 358/498; 358/496; 358/475; 358/474
(58) Field of Search ................................ 358/488, 475, 358/486, 474, 497, 494, 471, 496, 498, 400, 401; 250/234

(56) References Cited

U.S. PATENT DOCUMENTS 4,875,104 A * 10/1989 Kamon ....................... 358/400
5,119,213 A * 6/1992 Graves et al. ............... 358/488
5,510,908 A * 4/1996 Watanabe et al. ........... 358/488
5,568,281 A 10/1996 Kochis et al. ............... 358/475
5,760,412 A * 6/1998 Yang et al. .................. 358/488
5,764,380 A * 6/1998 Noguchi ...................... 358/488
5,790,211 A 8/1998 Seachman et al. ............. 349/3

FOREIGN PATENT DOCUMENTS

JP                411024185 A   *   1/1999

* cited by examiner

Primary Examiner—Cheukfan Lee

(57) ABSTRACT

An image scanner is provided that includes a transparent platen for supporting a page during a scanning operation, an automatic document feeder and an apparatus for detecting if the page is present on the platen. The apparatus includes an indicium positioned above a predetermined area on the platen. In order to determine if a page is present on the platen, the predetermined area is scanned. If the indicium can be detected, then it is assumed that a page is not present on the platen. If, however, the indicium is not detected, then it is assumed that a page is present on the platen and the user may then be notified.

6 Claims, 5 Drawing Sheets

APPARATUS AND METHOD FOR DETECTING THE PRESENCE OF A PAGE IN AN IMAGE SCANNER

BACKGROUND OF THE INVENTION

Traditionally, in the office equipment context, to make a copy of an original document, a light lens xerographic copier was used. In these machines, the image of the original is focused on an area of a photoreceptor, which is subsequently developed with a toner. The developed image on the photoreceptor is then transferred to a copy sheet to create a permanent copy of the original.

In recent years, there has been made available what are known as digital scanners. A digital scanner performs some of the same functions as a light lens copier such as illumination of the original document as well as focusing the image through lenses and mirrors (via an optical system). In a digital scanner, however, the original image is typically focused onto one or more linear arrays of photosensitve surfaces of an image sensor (e.g., a charged coupled device). The array of photosensitve surfaces converts the original image into a set of analog signals that can then be further processed into digital signals.

These digital signals can be temporarily retained in a memory and then eventually used to operate a printing apparatus when it is desired to print copies of the original. In some scanners, the digital signals may also be used to create facsimiles or electronic mail (e-mail) for transmission to external computing devices.

One common type of scanner is the flat bed scanner. Flat bed scanners are conventionally provided with a horizontal, flat and transparent platen and an opaque platen cover. In order to scan a page, a user can place the page over a predetermined area on the upper surface of the platen. This predetermined area is referred to herein as the "fixed page scan area".

After the page is placed over the fixed page scan area, the user then typically closes the cover over the page and initiates the scanning operation. During the scanning operation, the document is illuminated and the image sensor is optically exposed to each section of the page through the fixed page scan area on the platen. In general, this type of scan operation is referred to herein as a "fixed page scan operation" in order to indicate that the page being scanned is maintained in a fixed position on the upper surface of the platen during the scanning process.

A flat bed scanner may also be provided with an automatic document feeder (ADF). The ADF automatically feeds pages, one by one, over a second predetermined area on the upper surface of the platen. This second predetermined area is referred to herein as the "ADF scan area". In order to use the ADF to scan a page, a user first places the page in the input tray of the ADF and then initiates a scanning operation. During the scanning operation, the ADF moves the page over the ADF scan area as the image sensor is optically exposed to each section of the page (through the ADF scan area). It is noted that as the page is moved over the ADF scan area, the page may or may not physically contact the platen. For purposes of this application, this type of scan operation is referred to herein as an "ADF scan operation".

During an ADF scan operation a problem can arise if a left over page from a previous fixed page scan operation covers, or partially covers, the ADF scan area. If such a condition exists, the page (ADF page) being fed by the ADF may be improperly scanned as the left over page can block the optical path between the ADF page and the image sensor. This problem is compounded if the scanner is being used to FAX or e-mail the page. In such as case, the user may not have timely feedback that the ADF scan operation was not properly performed.

Prior solutions to this problem include incorporating into the flat bed scanner a page feed mechanism. Prior to starting an ADF scan operation, the page feed mechanism clears the ADF scan area of any pages left on the upper surface of the platen. Unfortunately, adding a page feed mechanism can be unduly costly and adds complexity to the scanner. In addition, the components in the page feed mechanism may fail over time. As a result, this solution can decrease scanner reliability and increase scanner service cost.

A second solution to this problem is to provide a sensor in the scanner for sensing the opening and closing of the platen cover. For example, if the scanner senses that the platen cover has been opened and then closed, it is assumed that a left over page exists on the platen. If the user then attempts to perform an ADF scan operation, the scanner notifies the user that a page may be present on the platen. If, however, the cover is opened a second time (presumably to remove the page from the platen) prior to an ADF scan operation it is assumed that the page has been removed from the platen. The problem with this solution is that these assumptions can be wrong. Thus, this second solution is often unreliable. Also, the additional sensors add cost and complexity to the scanner.

Accordingly, there is a need for a way to ensure a page is not covering the ADF scan area on the platen of a flat bed scanner prior to the scanner performing an ADF scan operation that is inexpensive, does not add complexity to the scanner and is reliable.

SUMMARY OF THE INVENTION

In one aspect of the present invention, apparatus is provided that can be used to detect whether a page is present on the platen of a flat bed scanner. Importantly, the apparatus is inexpensive, does not add significant complexity to the scanner and is reliable.

In one embodiment, the apparatus includes an indicium (i.e., a machine readable object or mark) and a sensor. The sensor includes one or more photosensitive surfaces for detecting the indicium when the photosensitive surface and indicium are in optical communication. The indicium and the sensor are positioned so that an optical path, passing through an area on the platen, exists between the one or more photosensitive surfaces and the indicium if the area is uncovered by a page. In operation, if the sensor fails to detect the indicium, then the sensor generates a signal indicating that a page is present on the platen. Preferably, the sensor is the same sensor (e.g., a CCD array) used by the scanner to scan a page.

The apparatus just described can be used to detect whether a page is present on the platen (and possibly covering the ADF scan area on the platen) prior to the scanner performing an ADF scan operation. If a page is detected, the apparatus can be adapted to notify the user.

In another embodiment, a flat bed scanner is provided. The scanner includes a platen and an indicium. The platen includes an upper transparent surface having a fixed page scan area over which a first page can be placed for scanning. The transparent surface also includes a page detect area which is located at least partially within the fixed page scan area. The indicium is positioned so as to face the page detect area. The scanner further includes a scanning mechanism that is operative to determine if a page is present on the transparent surface by scanning through the page detect area. If, during this scanning operation, the scanning mechanism fails to detect the indicium then a signal is generated indicating a page is present on the platen.

In yet another embodiment, the present invention is implemented as a method that may be performed to determine the presence of a page on the platen of a flat bed scanner. The method includes providing an indicium above an area on the platen. The method further includes scanning through this area to determine if the indicium can be detected. If the indicium is not detected, then it is determined that a page is present on the platen. The method just described may be used by the scanner to determine if a page is present on the platen prior to the scanner performing an ADF scan operation.

It should be understood that the foregoing summary and the following detailed description is only illustrative of the invention. Various alternatives and modifications can be devised by those skilled in the art without departing from the present invention. Accordingly, the present invention is intended to embrace all such alternatives, modifications and variances which fall within the scope of the appended claims.

DETAILED DESCRIPTION OF THE INVENTION

Figure 1:
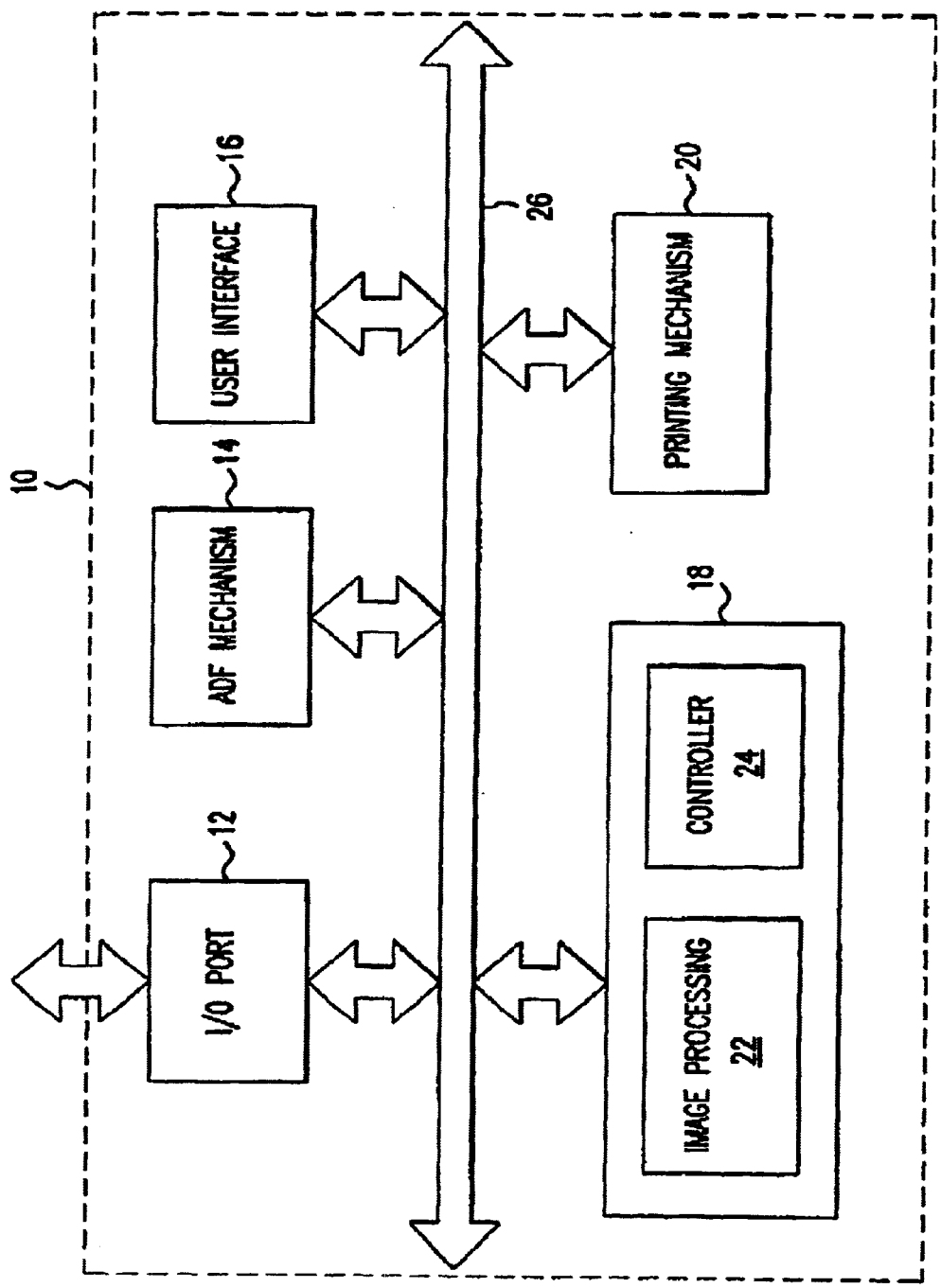
FIG. 1 is a simplified schematic block diagram of a flat bed scanner according to one aspect of the present invention.

For a general understanding of the present invention, reference is made to the drawings. In the drawings and in the specification, like reference numerals have been used throughout to designate identical or equivalent elements or steps.

FIG. 1 is a simplified schematic block diagram of a flat bed scanner according to one aspect of the present invention. The flat bed scanner 10 includes an I/O port 12, an ADF mechanism (ADF) 14, a user interface 16, and a scanning mechanism 18. In addition, the flat bed scanner may also include a printing mechanism 20. All these components are interconnected by a bus 26. The scanning mechanism 18 includes an image processing unit 22 and a controller 24.

The I/O port 12 provides the scanner 10 the capability to communicate with external computing devices. For example, the I/O port 12 may enable the scanner 10 to communicate with a personal computer over a network (e.g., the INTERNET or an Intranet), a parallel cable or a serial cable. The user interface 16 provides an interface for the user and may include one or more input keys and one or more displays. The printing mechanism 20 provides the scanner 10 printing capability. It is noted that in other embodiments the scanner may not include a printing mechanism.

Figure 2:
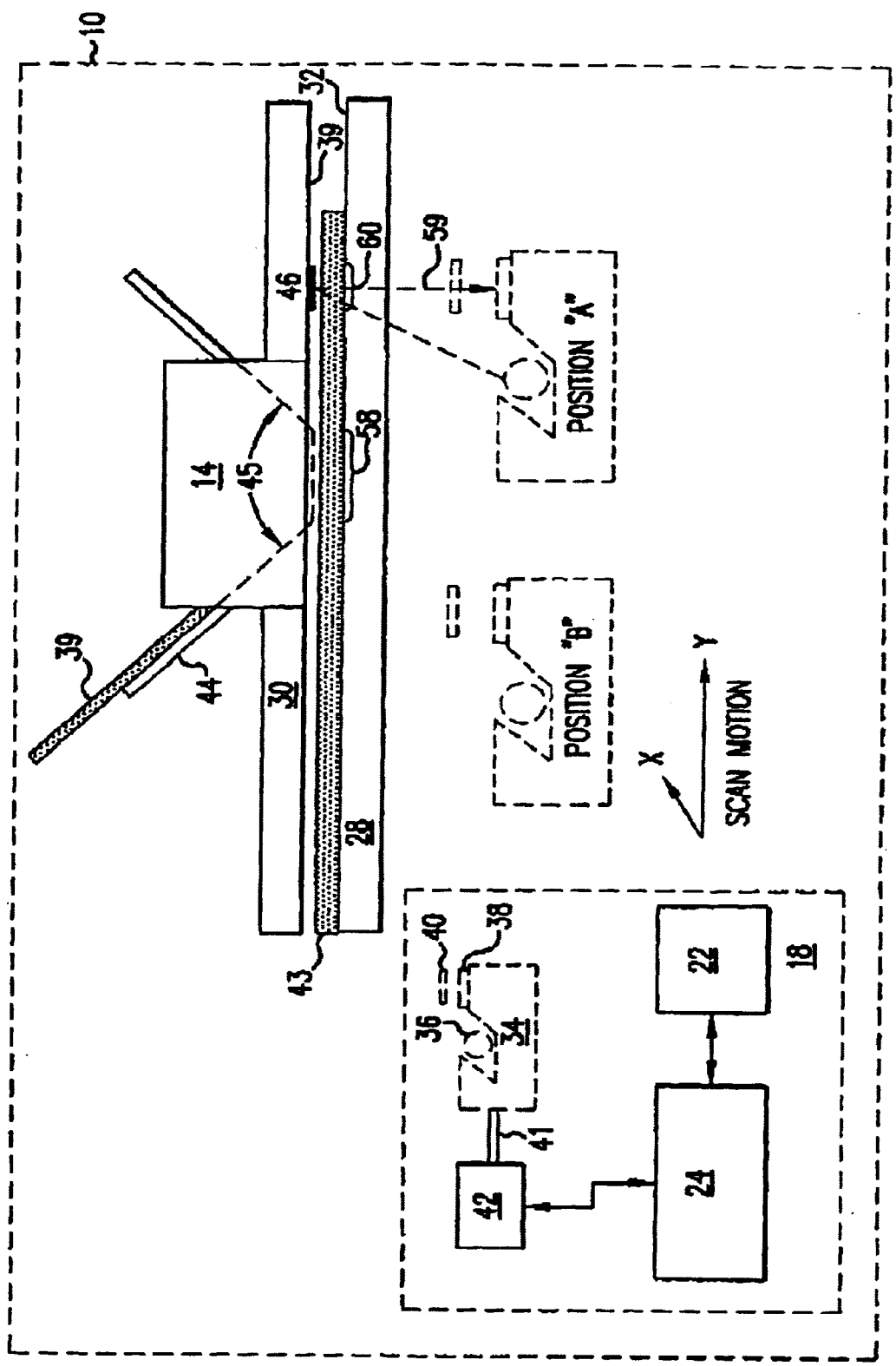
FIG. 2 is a simplified block diagram illustrating additional components in the scanner.

FIG. 2 is a simplified block diagram illustrating additional components in the scanner 10. As shown, the scanner 10 also includes a transparent platen 28 and a platen cover 30. The platen 28 includes an upper platen surface 32 to support a page during a fixed page scan operation. The ADF 14 is built into the platen cover 30 and is disposed above the upper surface (upper platen surface) 32. The scanning mechanism 18 further includes a moveable carriage 34 that includes an illumination source 36, an image sensor 38 and an optics system 40. A motor 42 is mechanically coupled to the carriage 34 via a couple 41. The couple 41 may include gears, cables, or the like, to move the carriage 34 in the Y direction, along the length of the platen 28 during a scanning operation.

Figure 3:
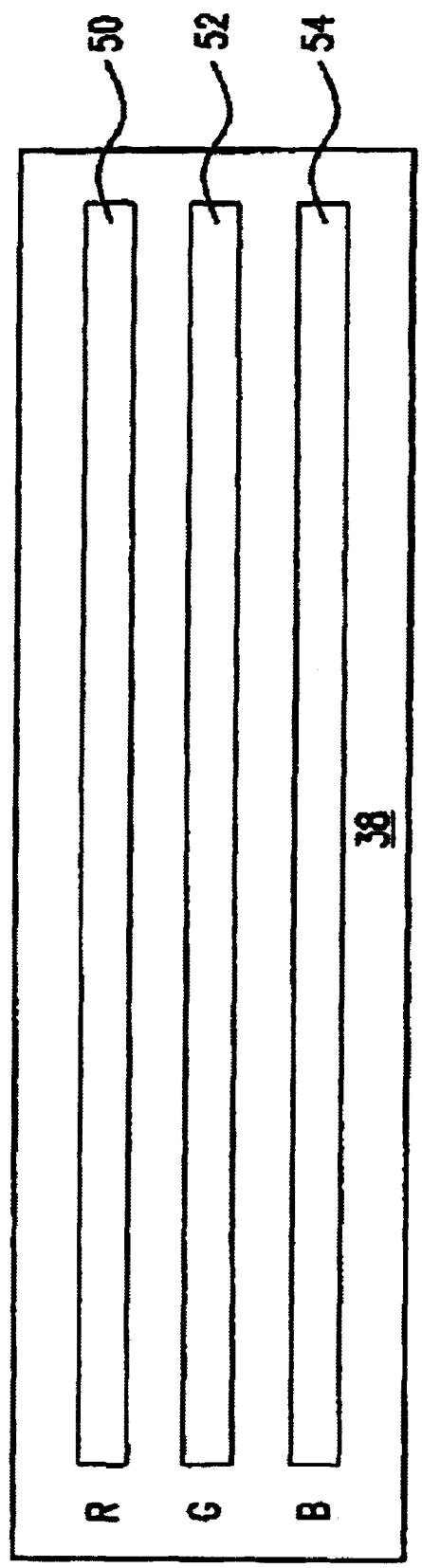
FIG. 3 illustrates an image sensor.

FIG. 3 further illustrates the image sensor 38 in the scanner 10. As shown, the image sensor 38 includes a tri-linear array of photosensitive surfaces. The image sensor 38 further includes a set of standard optical color filters for selectively absorbing or otherwise filtering, light having wavelengths outside of a predetermined range. In this example, these filters are adapted so that a first array 50 receives light having wavelengths predominately only in the red region, a second array 52 receives light having wavelengths predominately only in the green region and a third array 54 receives light having wavelengths predominately only in the blue region. It is noted that for purposes of the present application, the term "light" refers to electromagnetic radiation in the wavelength range including infrared, visible and ultraviolet.

Figure 4:
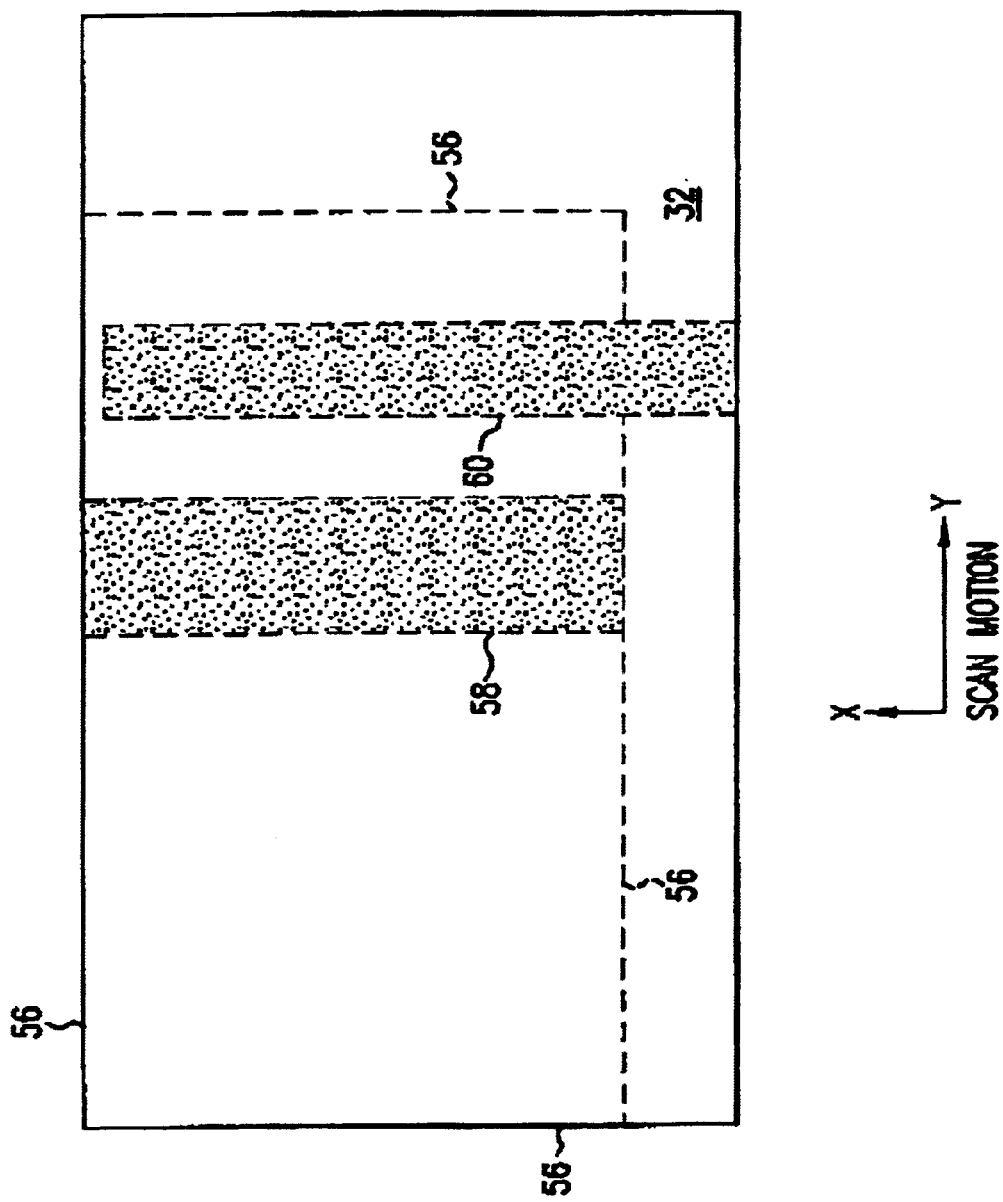
FIG. 4 is a top view of the upper platen surface in the scanner.

FIG. 4 is a top view of the upper platen surface 32. As shown, the upper platen surface 32 includes at least three predetermined areas: a fixed page scan area 56, an ADF scan area 58 and a "page detect area" 60. As indicated in FIG. 4, both the page detect area 60 and the ADF scan area 58 are located at least partially within the fixed page scan area 56. Thus, if a page is presently covering the fixed page scan area 56, the ADF scan area 58 and the page detect area 60 are also at least partially covered.

Referring again to FIG. 2, it is noted that the platen cover 30 preferably includes a uniformly colored (e.g., white or gray) lower surface 39 that provides a backdrop for the page being scanned. In this embodiment, the lower surface 39 is assumed to be white. Importantly, the white lower surface 39 includes an indicium 46 (i.e., a machine readable mark or object) positioned so as to oppose the page detect area 60 of the upper platen surface 32. The indicium 46 is adapted to reflect light having a pre-determined range of wavelengths. In this embodiment, for example, the indicium 46 is adapted to reflect light having wavelengths in the blue region. Therefore, the indicium 46 is detectable by the third array 54 of the image sensor 38.

In general, a user can make use of the scanner 10 to perform a fixed page scan operation or an ADF scan operation. For example, in order for a user to perform a fixed page scan operation of a page 43, the page 43 is first placed over the fixed page scan area 56 of the upper platen surface 32. The user then typically closes the cover 30 and initiates the fixed page scan operation by providing input to the user interface 16. The controller 24, in response to this user input, causes (via motor 42) the carriage 34 to move along the Y direction beneath the fixed page scan area 56. As the carriage 34 is moved beneath this area, the page 43 is scanned in a standard manner. The resulting analog image data is transmitted to the image processing unit 22 for further processing. The image processing unit 22 may then communicate the image data in some manner (e.g., via FAX or e-mail), over the I/O port 12, to an external computing device. Alternatively, or in combination, the image data may be used to cause the printing mechanism 20 to print one or more copies of the page 43.

Importantly, after the page 43 is scanned, the user may leave the page 43 on the upper platen surface 32. As indicated above, while the page 43 covers the fixed page scan area 56, the page also covers (at least partially) the ADF scan area 58. Thus, in order to properly perform an ADF scan operation, the page 43 should be removed.

As will now be shown, prior to an ADF scan operation being performed, the scanner 10 first automatically determines if a left over page is present on the upper platen surface 32. To illustrate how this is accomplished, it is assumed that the user desires to perform an ADF scan operation upon a page 39. To accomplish this, the user first places the page 39 on the input tray 44 and interfaces with the user interface 16 so that a request is generated to initiate an ADF scan operation. Alternatively, the request may also be generated by a sensor in the input tray 44 upon the detection of the presence of the page 39. In either case, after the request is generated it is transmitted to the controller 34.

Upon receiving the request to initiate an ADF scan operation, the controller 34 operates to perform a routine, which is accordance with the present invention, to determine if a left over page (e.g., page 43) is present on the upper platen surface 32.

Figure 5:
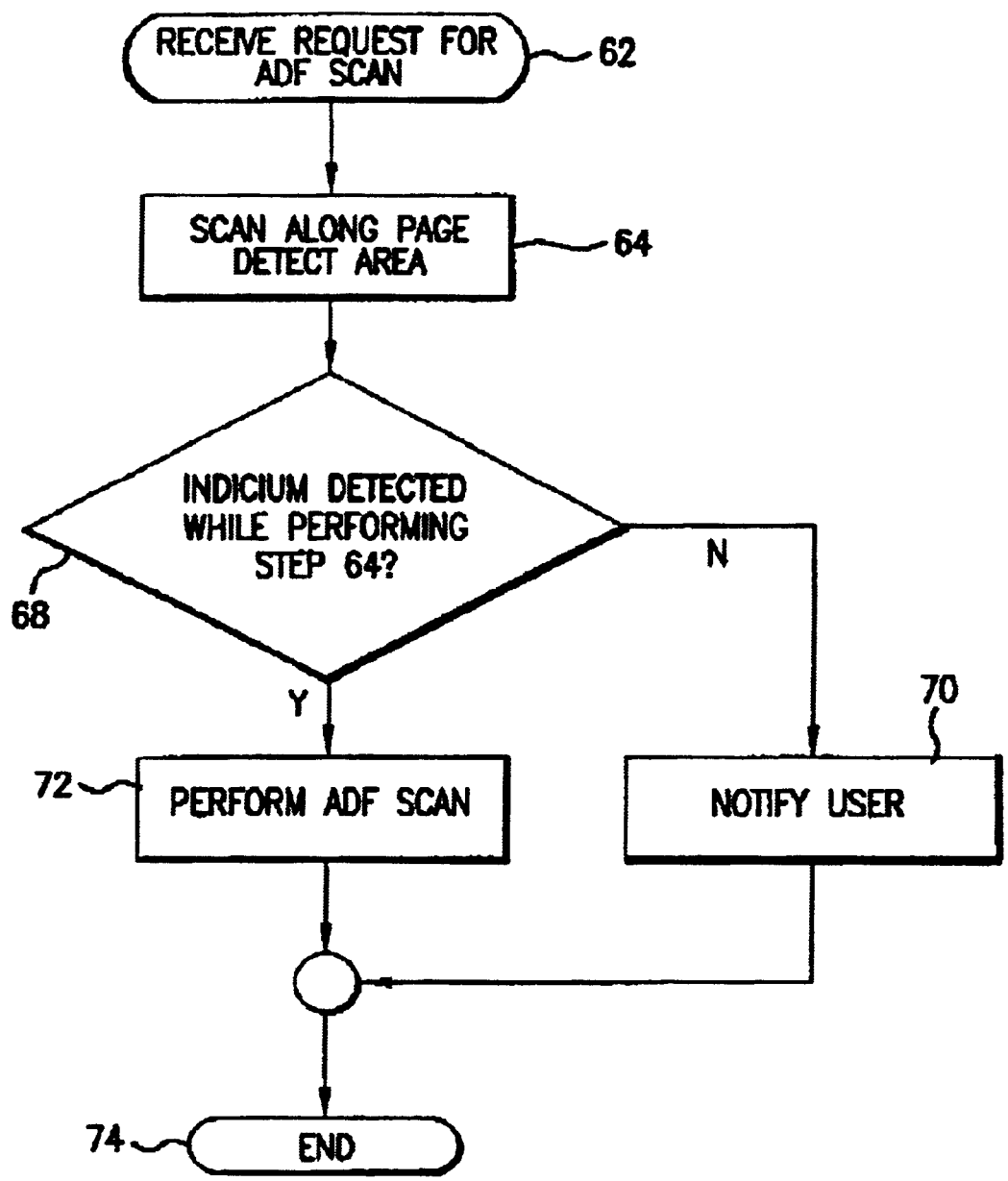
FIG. 5 is a flow diagram to illustrate a routine to determine if a page is present on the upper platen surface.

FIG. 5 is a flow diagram to illustrate this routine. As shown, the routine is initiated upon controller 24 receiving the request to initiate the ADF scan operation (step 62). Next, the controller 34 operates to cause the scanning mechanism 18 to scan along the page detect area 60 (step 64).

FIG. 2, illustrates one position (labeled as position "A") of the carriage 34 during the performance of step 64. As shown, while in position "A" an optical path 59 exists between the indicium 46 and the photosensitive surfaces of the image sensor 38. Importantly, the optical path 59 passes through the page detect area 60. Importantly, while in position "A", the photosensitive surfaces of the image sensor 38 are in optical communication with the indicium 46 through the page detect area 60. This is, of course, assuming the page detect area 60 is not presently covered by a left over page (e.g., page 43).

As step 64 is performed, a determination is made as to whether the indicium 46 is detected (decision step 68). As indicated above, the indicium reflects light in the blue region. Thus, if the data received while performing step 64 indicates the third array 54 was heavily exposed and the other two arrays were not heavily exposed, then a determination is made that the indicium was detected.

If the indicium 46 is detected, while performing step 64, this indicates that the page detect area 60 is not covered by a page and it is assumed from this condition that a left over page is not present on the upper platen surface 32. In response to this condition, the controller 24 initiates the ADF scan operation (step 72) and the rest of the ADF scan operation is performed in a standard manner. That is, the carriage 34 is moved to position "B" beneath the ADF scan area 58. The controller 24 then causes the scanning mechanism 18 to scan at this position in a standard manner as the ADF mechanism 14 moves the page 39 along a path 45 above the ADF scan area 58.

If, however, the indicium 46 (decision step 68) was not detected, then the controller 24 notifies (via user interface 16) the user that a left over page may be present on the upper platen surface 32 (step 70). The user can then remove the left over page and re-initiate the ADF scan operation.

From the foregoing, it can be seen that the apparatus just described for detecting a left over page has advantages over the prior art. For example, there are no additional components, other than the indicium, required to implement the present embodiment. Accordingly, there are no additional components that can fail and add complexity to the scanner. Also, it can be seen that the present invention provides a relatively inexpensive way for detecting the presence of a left over page on the platen.

It is noted that in the embodiment just described, the indicium is adapted to reflect blue light. Presently, this is considered preferable in order to avoid artifacts from the indicium when performing a fixed page scan operation upon thin or transparent pages. When such pages are scanned in a monochrome mode, only the green channel 52 of the image sensor 38 is read. As a result, the blue light reflected from the indicium 46 is filtered out during a monochrome scanning operation and is therefore not recorded. Of course, in other embodiments, the indicium may be adapted to reflect light in other wavelength ranges, such as infrared or even ultraviolet.

It is also noted that in other embodiments more than one indicium may be used. For example, indicia may be disposed above multiple areas on the platen (both before and after the ADF scan area). Alternatively, or in combination, an indicium may be disposed above the ADF scan area. In addition, the indicium may be differently shaped and sized or form a pattern.

In yet other embodiments, the image sensor used to detect the indicium is separate from the image sensor used for scanning. Although this adds an additional sensor to the scanner, it may increase the speed at which a left over page is detected.

It should be understood that the foregoing description is only illustrative of the invention. Various alternatives and modifications can be devised by those skilled in the art without departing from the present invention. For example, in the first embodiment the scanning mechanism included an image sensor mounted to a moveable carriage. In other embodiments, the image sensor is in a fixed location. An example of such a scanning mechanism is cillustrated in FIG. 1 of U.S. Pat. No. 5,568,281. That patent is incorporated herein by reference. Accordingly, the present invention is intended to embrace all such alternatives, modifications and variances which fall within the scope of the appended claims.

What is claimed is:

1. In a scanner, including a transparent surface for supporting a page during a scanning operation, an apparatus for detecting if an area on said surface is covered by said page, comprising:
   an indicium configured to reflect light having wavelengths within a predetermined range; and
   an optical sensor for detecting said indicium when the sensor is in optical communication with said indicium;
   at least one optical filter for filtering light having wavelengths outside of the predetermined range; and
   wherein said indicium, sensor and filter are positioned so that an optical path exists from said sensor, passing through said area and the filter, to said indicium thereby placing said sensor in optical communication with said indicium provided said area is uncovered by said page;
   wherein said sensor is operative to generate a signal indicating said area is
   covered by said pane If said sensor falls to detect said indicium; and
   wherein said sensor is further used for scanning said nape.

2. In a scanner, including a transparent surface for supporting a page during a scanning operation, an apparatus for detecting if an area on said surface is covered by said page, comprising:

an indicium configured to reflect light having wavelengths within a predetermined range; and an optical sensor for detecting said indicium when the sensor is in optical communication with said indicium;

at least one optical filter for filtering light having wavelengths outside of the predetermined range; and wherein sold indicium, sensor and filter are positioned so that an optical path exists from said sensor, passing through said area and the filter, to said indicium thereby placing said sensor in optical communication with said indicium provided said area is uncovered by said page;

wherein the filter filters light outside of the blue region; and wherein said indicium reflects light within said blue region.

3. In a scanner including an optically transparent surface having a first area over which a first page is placed to be scanned, a method for determining if said page is present on said surface comprising:

(a) providing an indicium above a second area on said transparent surface, said second area located at least partially within said first area and the indicium configured to reflect light having wavelengths substantially in the blue region;

(b) scanning through said second area;

(c) determining if light having wavelengths substantially in the blue region was detected while performing step (b); and if not then (d) determining that a page is present on said surface.

4. The method of claim 3, wherein step (d) further comprises the substep of notifying a user that said first page is present on said surface.

5. The method of claim 3, wherein said method is performed by said scanner prior to performing an ADF scan operation in order to determine if an ADF scan area on said transparent surface is covered by said page.

6. In a scanner including an optically transparent surface having a first area over which a first page is placed to be scanned, a method for determining if said page is present on said surface comprising:

(a) providing an indicium above a second area on said transparent surface, said second area located at least partially within said first area and the indicium configured to reflect light having wavelengths substantially in the infra-red region;

(b) scanning through said second area;

(c) determining if light having wavelengths substantially in the infra-red region was detected while performing step (b); and if not then (d) notifying a user that a page is present on said surface.

* * * * *

UNITED STATES PATENT AND TRADEMARK OFFICE
CERTIFICATE OF CORRECTION

PATENT NO. : 6,643,037 B1
DATED : November 4, 2003
INVENTOR(S) : Paul L. Jeran et al.

It is certified that error appears in the above-identified patent and that said Letters Patent is hereby corrected as shown below:

Column 3,
Line 46, after "scanner" insert -- 10 --

Column 6,
Line 36, delete "cillustrated" and insert therefor -- illustrated --
Line 61, delete "pane If" and insert therefor -- page if --
Line 61, delete "falls" and insert therefor -- fails --
Line 63, delete "nape" and insert therefor -- page --

Column 7,
Line 7, delete "sold" and insert therefor -- said --

Signed and Sealed this

Fourth Day of January, 2005

JON W. DUDAS
*Director of the United States Patent and Trademark Office*